United States Patent [19]

Robinson, Jr. et al.

[11] 4,423,788

[45] Jan. 3, 1984

[54] AGRICULTURAL FURROW FORMING APPARATUS DEPTH CONTROL

[75] Inventors: Edward L. Robinson, Jr., Naperville; Lawerence D. Westerfield, Romeoville, both of Ill.

[73] Assignee: International Harvester Co., Chicago, Ill.

[21] Appl. No.: 265,513

[22] Filed: May 20, 1981

[51] Int. Cl.³ .................. A01B 63/16; B60S 9/00
[52] U.S. Cl. ........................ 172/427; 111/85; 111/88; 280/6 R; 280/43.13; 172/430; 172/536; 172/624.5
[58] Field of Search ............ 172/4, 78, 239, 397, 172/398, 383, 386, 400, 414, 423, 425, 539, 538, 574–576, 578, 738, 430, 406, 421, 624, 624.5, 536, 427; 111/85, 88; 56/DIG. 10; 280/6 R, 6.1, 6.11, 43, 43.1, 43.13; 180/41; 111/85, 88

[56] References Cited

U.S. PATENT DOCUMENTS

| | | | |
|---|---|---|---|
| 1,308,574 | 7/1919 | Brady | 116/334 |
| 2,603,138 | 7/1952 | Rafferty | 172/538 X |
| 2,954,833 | 10/1960 | Davidson | 280/6.11 |
| 3,433,307 | 3/1969 | Gilbert | 172/4 |
| 3,433,309 | 3/1969 | Michaelis et al. | 172/430 |
| 3,814,200 | 6/1974 | Hirst et al. | 280/6 R |
| 4,009,668 | 3/1977 | Brass et al. | 111/85 |
| 4,116,140 | 9/1978 | Anderson et al. | 172/624 |
| 4,139,065 | 2/1979 | Lewison | 172/400 |
| 4,356,780 | 11/1982 | Bauman | 111/85 |

FOREIGN PATENT DOCUMENTS 2415421 8/1979 France .................. 111/86

OTHER PUBLICATIONS

John Deere Parts Catalogue-Max-Emerge Drawn Planters, Feb. 1981.

Primary Examiner—Edgar S. Burr
Assistant Examiner—David A. Wiecking
Attorney, Agent, or Firm—Dennis K. Sullivan; F. David AuBuchon

[57] ABSTRACT

An apparatus to be towed that includes a frame supported, rotatably mounted, pair of furrow forming disks that are arranged to substantially contact each other at the approximate point of entry into the soil and diverge apart rearwardly and upwardly, a pair of rotatable gauge wheels having supports that individually and pivotally connect the wheels to the frame with each wheel being located generally adjacent an outer surface of a disk, a gauge wheel adjustment assembly slidably mounted in said frame and having an equalizer assembly connecting the supports whereby movement of a support and thus wheel in one direction produces the same movement of the other support and wheel in a contrary direction and including an indicator, furrow depth indicating structure having a zero position and spaced indicia for indicating furrow depth and adjustment structure for movably mounting the indicating structure on the frame, and structure for selectively immobilizing the equalizer assembly in a neutral position whereby with the wheels in the lowest position and resting on a level surface and then raised until the disks contact the level surface and the zero position being located opposite the indicator by the adjustment structure and secured to the frame, accurate depth control is achieved when the equalizer assembly is released for furrow forming.

6 Claims, 8 Drawing Figures

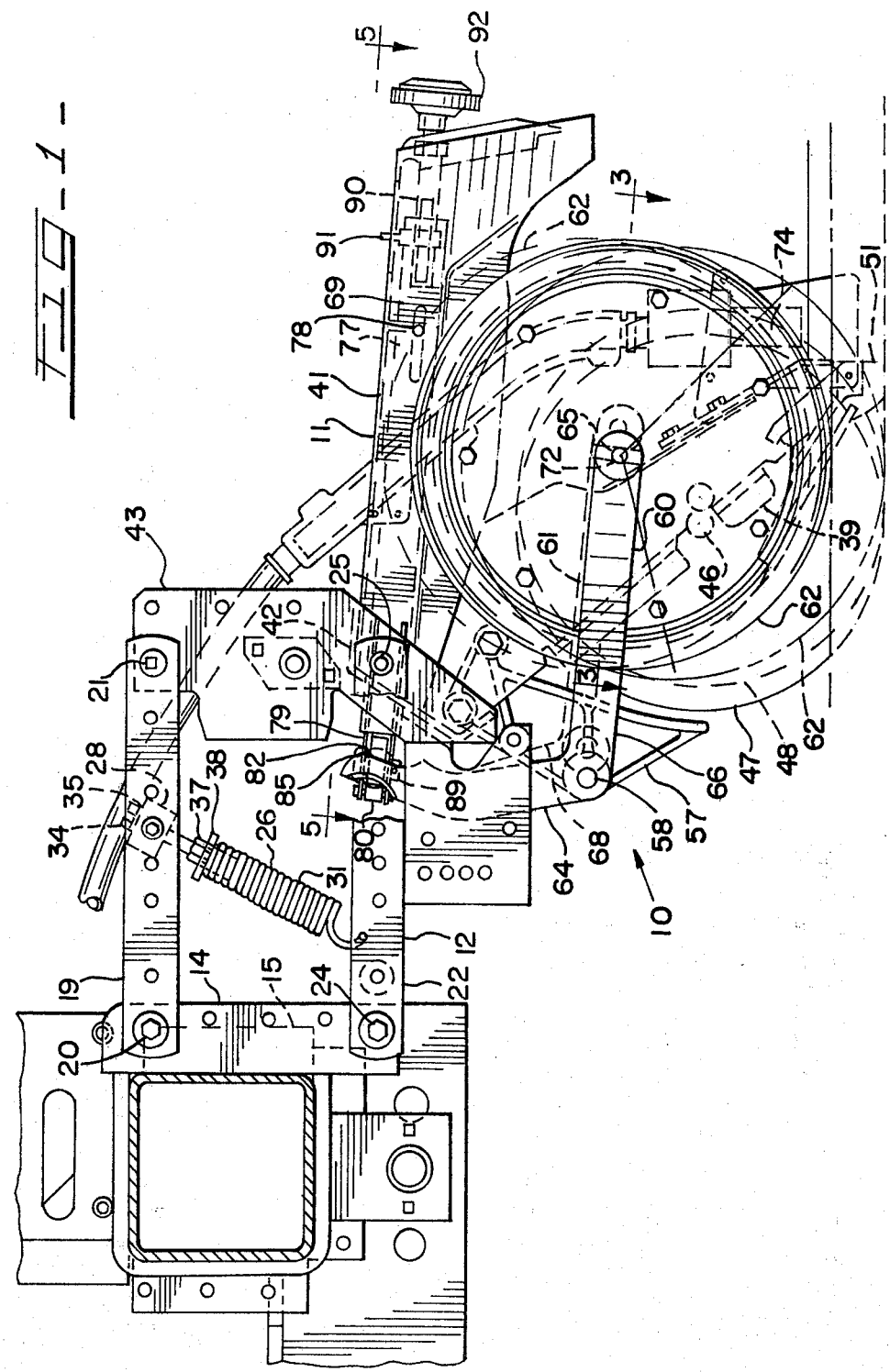

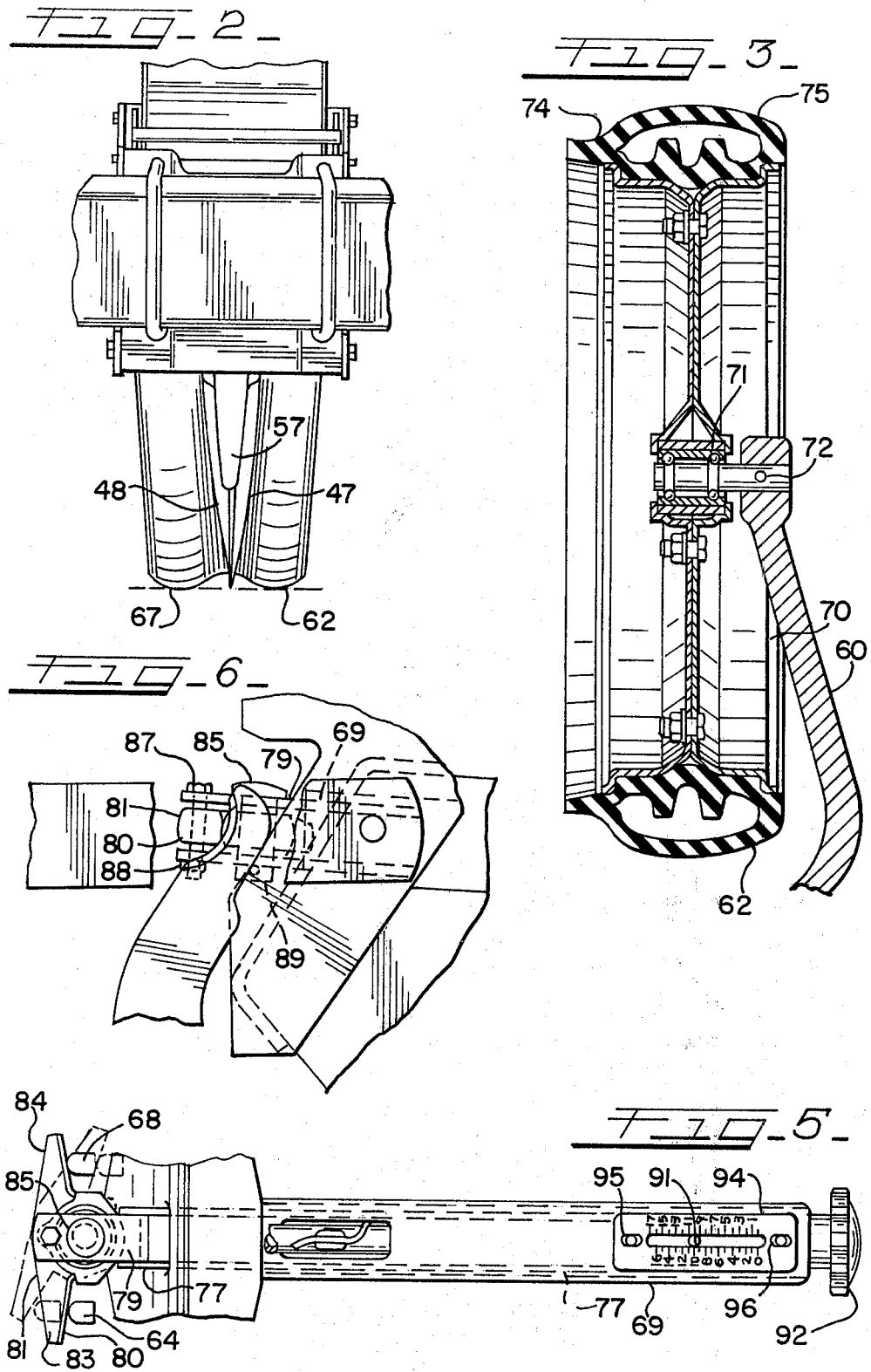

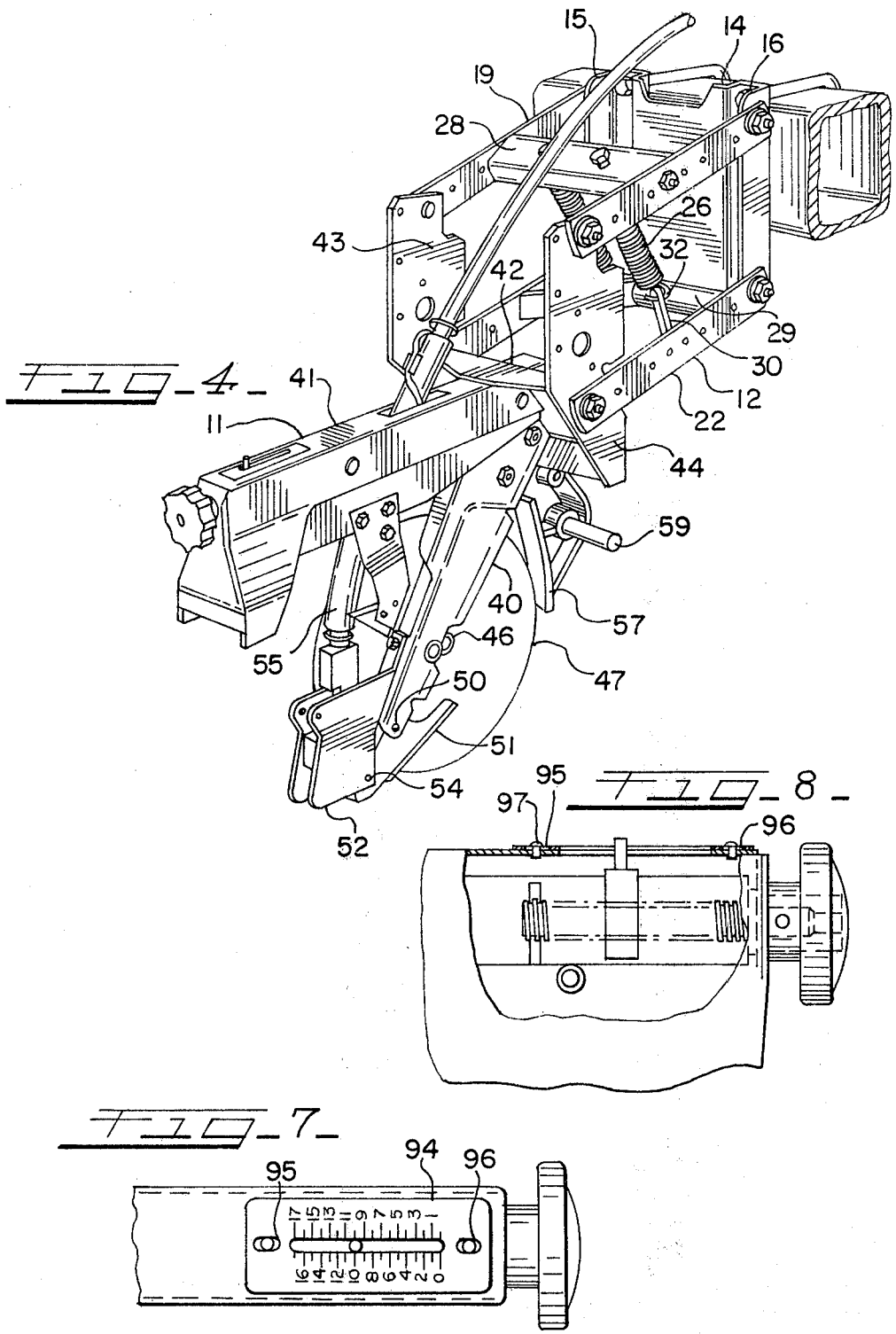

AGRICULTURAL FURROW FORMING APPARATUS DEPTH CONTROL

FIELD OF THE INVENTION

This invention pertains generally to agricultural planting equipment.

DESCRIPTION OF THE PRIOR ART

Furrow depth, and hence planting depth of seeds in a furrow, which is the vertical distance therefrom to the top of the uniform soil covering of the seeds, is critical because it affects percent of emergence, time to emerge, and uniformity of plant emergence. Seeds should be planted as shallow as possible in moist soil to promote rapid germination and emergence. Thus, the moisture level in the field to be planted must be determined and the depth selected at which the seeds are to be planted. However, for emergence in no circumstances should corn, for example, be planted deeper than two to three inches (51 to 76 mm) or soybeans from one and a half to two inches (38 to 51 mm). Thus the related furrow depth, which is the difference between the gauge wheel impressions and the adjacent disks must be capable of being set with precision in a very narrow range and all of the tool bar mounted apparatuses used—when preferably at the same setting—should be within that range.

Unfortunately, at the present time, all conventional furrow forming apparatuses or planters incorporating same merely provide a fixed series of possibly 0.625" or slightly less spaced holes to obtain incremental depth adjustment with the lever which acts on the gauge wheel arms that are pivotally mounted on the frame to control furrow depth, engaging same and also being held thereby. The procedure utilized to obtain the desired furrow depth is to plant seeds and measure the related planting depth until the particular hole is located that provides a reasonably close approximation of the desired furrow depth. Since several apparatuses are usually used at one time, merely utilizing the same hole setting of the second apparatus as the first does not maintain the same furrow depth primarily due to production and mounted tolerances. The tolerances are often substantial enough to provide a furrow depth that so varies from that of the first apparatus that they are not even within a reasonable range of the first furrow depth and indeed the seeds may not even emerge. Thus, it is necessary with the conventional apparatuses to follow the same procedure for all of the additional apparatuses as with the first apparatus to substantially achieve a desired furrow depth by utilizing other holes. This is a very time consuming process and one that must be repeated when the desired planting depth changes due to changes in soil type or other factors.

SUMMARY OF THE INVENTION

Applicants as a consequence, designed an apparatus that substantially eliminates the problems detailed above. Generally, Applicants provide structure wherein the furrow and thus related planting depth of each apparatus can be zeroed in the field while mounted on a tool bar to compensate for manufacturing tolerances, mounting tolerances, and all other variables that affect furrow depth so that the desired set furrow depth for the first apparatus may be likewise set on the other apparatuses which may or may not require zero setting (without the digging and seed depth measuring procedures) with all apparatuses then producing substantially the same furrow depth. This greatly reduces the set up time. Also, it is particularly useful when furrow depth changes are made. The above structure also takes into account the use of an equalizer bar whereby gauge wheel movement in one direction produces a contrary movement of the other gauge wheel in the other direction to average frame height change when an obstacle is encountered which structure is not found on most conventional apparatuses. Also, the structure compensates for apparatus changes such as gauge wheels and support arms.

Specifically, in an apparatus that supports dual disk openers and has a gauge wheel located adjacent each disk by a support arm pivotally mounted on the apparatus and mechanism to move the support arms via an equalizer bar and thus the wheels to vary the disk and hence furrow depth, Applicants provide structure to selectively immobilize the equalizer bar in a neutral position. Where the mechanism includes a slide slidably mounted in the apparatus that is movable by a threaded rod via a knob fastened thereto and also has indicator means movable with the thread, Applicants provide a gauge plate having a zero indication and graduated therefrom to seventeen equal and numbered divisions for movement adjacent thereto by the indicator. The plate also has longitudinally spaced forward and rear slotted holes for movably fastening same to the apparatus frame as desired by suitable screws.

The procedure to zero set the apparatus in the field if found to be inaccurate for a reason listed above is to raise the tool bar and thus all apparatuses, turn the depth control knob of the inaccurate apparatus until the indicator is in the mid range of the scale, immobilize the equalizer bar in the neutral position by inserting a bolt through a hole in the slide and equalizer bar and fastening same with a nut, loosen the screws and slide the scale to the rear toward the knob and move the indicator toward zero on the scale until no movement is possible. The tool bar and apparatuses are then lowered to a level surface with all unit down pressure spring loads equal. In this condition the disks are above the level surface and also the pivotally mounted furrow forming point if used, with the wheels on the level surface. The control knob is then turned until the disks and point contact the level surface. Since this condition represents the zero furrow depth, the zero on the gauge plate is aligned with the indicator and the screws are tightened to hold the gauge plate in this condition. Thus all apparatuses are then set at the zero depth regardless of structural variations. If the furrow depth is to be adjusted, a zeroed apparatus may be set at the desired depth, which due to the threaded arrangement can be precisely that desired, and when checked and found to be accurate, all of the other apparatuses can be set to this identical setting and will achieve the same depth without further checking. The bolt must be removed from the slide and equalizer bar before adjusting the furrow depth and also before creating a furrow. The depths can be maintained by spring detents engaging the knob in the set position.

The immobilizing of the equalizer bar in the neutral position is required to move the rearward wheel arm structure of each wheel equally rearwardly until the wheels are lowered. When the apparatus is lowered to the level surface of the arms remain tight against the bar until the zero position is attained. They will continue to be against the bar as the wheels are raised and the planting depth increases. After equalizing occurs, they will continue to be against the bar while in the equalizing range. Thus, all zeroed apparatuses will create the same furrow depth when at the same settings.

It is, therefore, an object of this invention to provide a new and improved furrow forming apparatus depth control.

Another object is to provide an apparatus that when a furrow depth is zero set, all like set apparatuses having the same control create the same furrow depth.

Another object is to provide an apparatus depth control that can be zeroed in the field.

BRIEF DESCRIPTION OF THE DRAWINGS

FIG. 1 is a side elevational view of the apparatus of this invention;

FIG. 2 is a view looking rearward before the tool bar showing the apparatus set at zero furrow depth on a level surface;

FIG. 3 is a sectional view of a gauge wheel and support arm of the apparatus taken along line 3—3 of FIG. 1;

FIG. 4 is a perspective right side view of the apparatus with the right disk and right gauge wheel removed;

FIG. 5 is a partial plan view of the apparatus taken along line 5—5 of FIG. 1 showing the equalizer and gauge wheel adjustment;

FIG. 6 is an enlarged side view of the front portion of FIG. 5 showing the equalizer immobilizing device;

FIG. 7 is an enlarged plan view of the furrow depth indicating adjustment means; and FIG. 8 is a side view of the structure of FIG. 7.

DESCRIPTION OF THE PREFERRED EMBODIMENT

Referring to FIGS. 1, 2, 4, and 5, 10 indicates a furrow forming apparatus depth control for a seed planter. Apparatus 10 has a frame 11. Apparatus 10 includes a mounting means 12 for attachment to a mobile power source such as a tractor or tool bar for towing. Mounting means 12 includes a head bracket 14 having lateral flanges 15 and 16. Bracket 14 has suitable holes for connection thereof to the tool bar by U-bolts and nuts. Dual spaced upper links 19 are pivotally connected to the upper part of flanges 15 and 16 at pivots 20 by suitable fasteners and are similarly connected to frame 11 at 21. Dual, spaced lower links 22 are similarly connected between the noted flanges at pivots 24 and the frame at 25. The conventional parallel linkage arrangement described allows the apparatus to follow the ground contour in operation.

Where the apparatus does not have sufficient weight to create the furrow, dual biasing means 26 are provided. Each means 26 extends between channel 28 attached between upper links 19 and support structure which includes tube 29 rigidly connected between links 22 and braces 30 extending between tube 29 (see FIG. 4) and each link 22. Means 26 includes spring 31 having a hook end 32 which connects with a suitable aperture in brace 30. Bolt 34, top washer 35 and lock nut 37 along with internally threaded plug 38 which is threaded inside spring 31, connect the spring 31 to the top channel 28. It can be seen that spring adjustment can be provided by loosening lock nut 37 and rotating bolt 34 clockwise which will cause the plug 38 to move thereto, thereby extending spring 31. Due to the connection of spring 31 to the upper links 19 remote from pivot 20, compared to the hook end 32 of spring 31 which is located close to pivot 24, the parallel linkage is spring loaded downward to increase the force applied to later to be described opener disks to insure that they penetrate the soil. Moving top channel 28 to other holes shown in top links 19 will provide further adjustment.

Frame 11 is a weldment that provides the necessary structure for all elements of the apparatus. As shown best in FIGS. 1 and 4, frame 11 consists of left 39 and right hand 40 lower sheets that provide the support for the later to be described disks, compaction runner, seed shoe, and gauge wheels. Frame 11 also includes upper channel 41 which is welded to the sheets and which houses the gauge wheel adjustment and spreader plate 42 which primarily provides support for left and right hand plates 43 and 44 on which are mounted pivots 21 and 25 of the parallel bar linkage. Suitable structure in the plates provide stops as desired for the parallel linkage.

Referring also to FIG. 4, support 46 is welded into sheets 39 and 40 and supports furrow forming disks 47 and 48. Preferably the axes of the fourteen inch diameter disks are staggered longitudinally by one inch with left disk 47 forward and the axes inclined so that the included angle is 9.5 degrees and the disks substantially contact each other at a point forward of their axes at about 38 degrees downwardly from the horizontal. Flange type bearings are utilized to rotatably mount the disks to support 46 welded to frame 11.

Located below support 46 is pin 50 which loosely supports compaction runner 51. Runner 51 also has a lower V-shaped configuration that extends slightly below the disks to provide the desired firmed furrow configuration. Runner 51 is also pivotally supported on rearward deflector or shoe 52 via pin 54 with shoe 52 being attached to sheets 39 and 40 by suitable cap screws shown. Shoe 52 is also spaced for seed tube 55 which extends therebetween to drop seed rearward of the V-shaped portion of the runner 51 into a furrow. Shoe 52 also prevents the movement of loose soil back into the furrow until the seed has been deposited.

Located forwardly of support 46 and connected between sheets 39 and 40 by suitable fasteners is gauge wheel mounting 57. Mounting 57 has pins 58 and 59 which are staggered longitudinally by one inch as the disks, with pin 58 forward and the pins are threaded into the mounting on axes parallel to the disk axes. As shown best in FIG. 1, mounted on pin 58 is left hand arm or support 60. Arm 60 has a rearwardly extending portion 61 that is connected to gauge wheel assembly 62 and a forwardly extending portion 64. Right hand arm of support 65 is similar to 60, and has rearward portion 66 for gauge wheel assembly 67 (not shown in FIG. 1) but because of the staggered mounting, has a longer forward upper portion 68 than 64 since they are transversely aligned to contact gauge wheel depth adjustment mechanism 69.

Gauge wheel assembly 62 (see FIG. 3) is typical for both arms 60 and 65 and includes wheel 70 made from composite elements connected by suitable fasteners. Each arm 60 (and 65) is connected to a roller bearing 71 with integral shaft by pin 72. It is to be noted that the bore for bearing 72 in arm 60 is inclined laterally outwardly and downwardly by about 2.50° from the associated disk, as shown in FIG. 2, so that radially inward peripheral lip 74 of semi-pneumatic tire 75 will substantially contact its disk at an arc of about 8:30 to 4:30 throughout its travel as shown in broken lines in FIG. 1 and create an uncompacted amount of loose soil alongside the furrow wall. This arc extends beyond the point of entry of the disk into the soil and its exit and helps prevent the flow of trash between wheel and disk. Primarily it provides a mound of uncompacted soil for later deposition into a furrow to provide uniform cover by any suitable means for the seed regardless of soil type in conjunction with the other gauge wheel. The flexing of tire 75 helps prevent caking of soil thereon.

Gauge wheel adjustment mechanism 69 is shown best in FIGS. 1 and 5. Mechanism 69 is located in the upper channel 41 of frame 11 and is readily accessible from the end of the apparatus remote from the tool bar. Mechanism 69 includes hollow slide 77 located in channel 41 and supported for movement on pins 78 (one shown) extending through channel 41 and slots in slide 77. Slide 77 also has a clevis end 79 rigid therewith and extending through a suitable opening through spreader plate 42 for equalizer bar assembly 80 which is a part of the mechanism.

Assembly 80, as also shown in FIG. 6, includes bar 81 having spherical bearing 82 mounted in a spherical opening in the center of bar 81. Bar 81 has left arm 83 adjacent but forward of support arm 64 and right arm 84 adjacent and forward of support arm 68. Pin 85 extends between suitable holes in clevis 79 and via a fastener 89 rigidly holds spherical bearing 82 therebetween. Therefore, pivotal movement of bar 81 causes rotation thereof about spherical bearing 82. As noted in FIG. 1, as support arms 64 and 68 move on their arcs and contact arms 83 and 84 of bar 81, the spherical bearing 82 also accommodates the movement of bar 81 thereon so the arms 83 and 84 will follow the gauge wheel support arms in the most efficient manner. The equalizer action insures that the gauge wheels carry equal weight. FIG. 5, in broken lines, show the position taken by equalizer bar 81 when left gauge wheel assembly 62 encounters an obstacle and support arm 64 moves 83 of bar forward as shown. Arm 84 is then forced rearwardly to move support arm 68 also rearwardly and thus right gauge wheel assembly 67 downwardly. As mentioned, if gauge wheel 67 is on the soil as before, it and wheel assembly 62 will both support the frame with the frame only rising half the height of the obstacle.

Also, a part of mechanism 69 is structure for selectively immobilizing the equalizer assembly 80 (see also FIG. 6). This structure is necessary for zeroing the later to be described furrow depth indicating means so that all like apparatuses will achieve the same depth control as set. This structure includes a bolt 87 extending through suitable openings in clevis 79 and bar 81 midway between arms 83 and 84 and held therein by nut 88.

Mechanism 69 further includes structure for infinite adjustment of slide 77 through a planting range of 0-4 inches furrow depth. Right hand threaded rod 90 is engageable with a complementary internal threaded located in the rear end of slide 77 to move same. Also, mounted on rod 90 for movement therewith is indicator 91 that has a portion extending outside of frame 11 and therefore provides an indication of the position of slide 77. Rod 90 is fixedly attached to knob 92 which is located outside of frame 11 for actuation by an apparatus operator. A plurality of detent means (not shown) located in the frame 11 and engageable with the knob prevents movement of same once set. Thus, clockwise rotation of knob 92 will cause slide 77 to move rearwardly toward the zero position with the equalizer assembly 80 moving support arms 64 and 68 and thus wheel assemblies 62 and 67 downwardly, raising frame 11 and thus the disks to reduce furrow depth. Contrary rotation will increase furrow depth with infinite adjustment provided.

Furrow depth indicating gauge structure 94 (see FIGS. 5 and 7) is movably located on frame 11 adjacent indicator 91 and has a zero indicating position and equally spaced indicia (numbers shown) extending therefrom. Adjustment structure including forward and rearward slotted holes 95 and 96 respectively in structure 94, when utilized with capscrews 97, provide an adjustable mounting of the structure 94 to provide an accurate depth indication with indicator 91.

Referring to FIG. 1, the gauge wheels are shown in broken lines at the same elevation of the disks at the zero furrow position. FIG. 2 also indicates the zero furrow position. The solid line position of the gauge wheels in FIG. 1 discloses an approximate two inch planting furrow, while the upper broken line position shows the approximate highest elevation of the gauge wheels which provides approximately a four inch furrow depth.

In operation to achieve accurate furrow depth control so that the setting of the furrow depth on one apparatus is the same as the others—without further experimentation—requires that the apparatus depth control be zeroed in the field on the tool bar if needed. This is accomplished by raising the tool bar and hence apparatus and preferably turning the knob 92 until indicator 91 is in a mid position on the scale. Bolt 87 is then inserted in the openings in clevis 79 and bar 81 and held thereon by nut 88. Equalizer bar 81 is then immobilized in the neutral position. Screws 97 are loosened and structure 94 is moved rearward as far as possible that holes 95 and 96 allow. Knob 92 is also rotated clockwise until no further movement is possible with gauge wheel 62 and 67 assemblies as low as possible. The tool bar is now lowered until the wheel assemblies rest on a level surface with supports 64 and 68 in contact with bar 81 and a moderate load from springs 31. In this position, disks 47 and 48 and runner 51 are above the level surface. Knob 92 is not rotated counterclockwise until the disks contact the level surface as shown in FIG. 2. Runner 51, which normally extends below the disks, will also rest on the level surface due to the loose mounting on pin 50. Gauge structure 94 is now adjusted until the zero position is opposite indicator 91 and capscrews 97 tightened. The depth control of apparatus 10 is thus zeroed. If the similar apparatuses on the tool bar are likewise zeroed, the furrow depth set on all apparatuses will, after removal of bolt 87 and raising the tool bar, produce identical depth furrows regardless of any variances in mounting or production parts when the tool bar is lowered and equalized furrow forming is commenced.

What is claimed is:

1. A furrow forming apparatus for a planter unit comprising:
   a planting unit frame adapted to be attached to a tool bar;
   a furrow opening assembly including a pair of opposed, furrow forming discs rotatably mounted on said planting unit frame with the discs in substantial contact at the approximate point of entry into the soil and diverging rearwardly upwardly relative to the direction of travel, said furrow opening assembly having a lowermost point defining the bottom of an opened furrow;
   a first gauge wheel support arm pivotally mounted on said planting unit frame, said support arm having a first gauge wheel rotatably mounted at one end thereof and disposed adjacent to said discs;

a second gauge wheel support arm pivotally mounted on said planting unit frame, said support arm having a second gauge wheel rotatably mounted at one end thereof and disposed adjacent said discs on the opposite side thereof from said first gauge wheel;

gauge wheel adjustment means mounted on said planter unit frame and operatively associated with said first and second gauge wheel support arms to control the height of said planting unit from the ground, said gauge wheel adjustment means including an equalizer bar mounted on a fixed pivot, the ends of said equalizer bar operatively interconnecting said first support arm and said second support arm, said gauge wheel adjustment means having a first planting mode of operation in which movements of one gauge wheel within a predetermined normal range of planter operation, including operation on a level surface, are dependent on equal opposite movements of the other gauge wheel, and said furrow opening assembly penetrates the ground, and a second adjustment mode in which the distance from said lowermost point of said furrow opening assembly to the planting unit frame is equal to the distance from the lowermost point of said gauge wheels to the planting unit frame; and means for selectively holding the lowermost points of each of said gauge wheels in horizontal alignment with each other and with said lowermost point of said furrow opening assembly upon said gauge wheel adjustment means being in said adjustment mode.

2. The apparatus of claim 1 including furrow depth indicating means cooperative with said gauge wheel adjustment means for indicating the relative spacing between said planting unit frame and the surface of the ground and thus the depth of said furrow, said indicating means having indicia and means for adjusting said indicia including a spaced pair of slotted holes in said indicating means and complementary fasteners to selectively secure said indicating means to said planting unit frame.

3. The apparatus of claim 2 in which said holes are elongated in the direction of indicator travel.

4. The apparatus of claim 3 in which said gauge wheel adjustment means includes a slide slidably mounted in said frame and said equalizer bar is pivotally mounted on said slide.

5. The apparatus of claim 4 in which said means for selectively immobilizing said equalizer bar includes a bolt extending through apertures in said arm and said slide and secured therein by a fastener.

6. The apparatus of claim 5 in which said gauge wheel adjustment means includes a threaded portion in said slide and a threaded rod engageable with said threaded portion and a knob for rotating said rod.

* * * * *